H. B. NICKERSON.
Improvement in Files.
No. 114,962. Patented May 16, 1871.
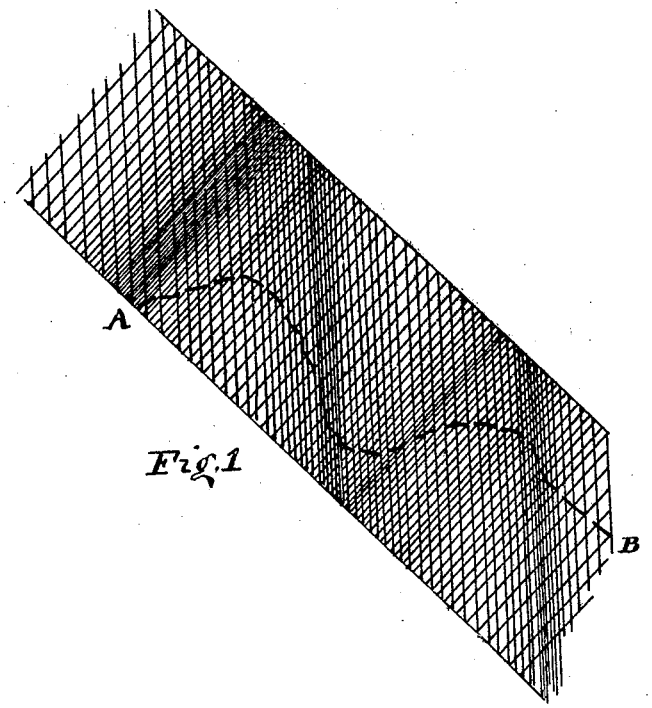
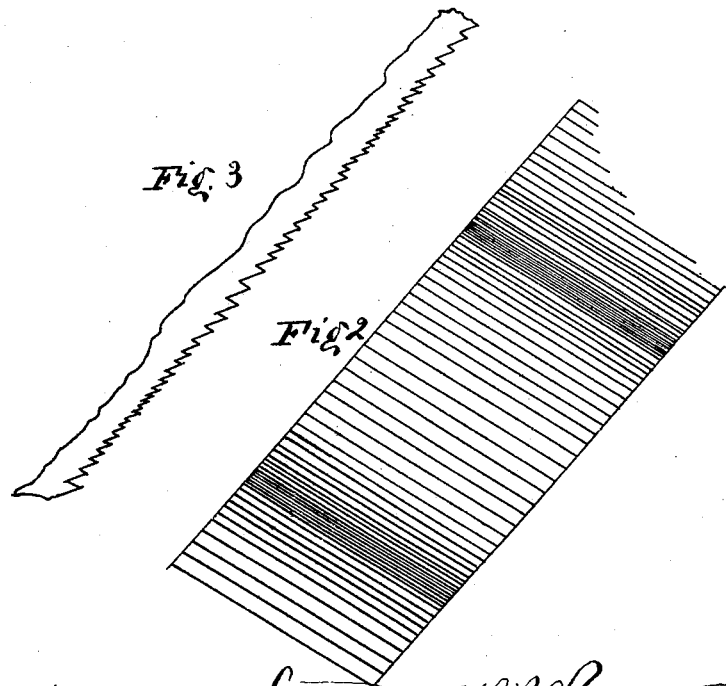

United States Patent Office.

HIRAM B. NICKERSON, OF BOSTON, MASSACHUSETTS.

Letters Patent No. 114,962, dated May 16, 1871; antedated May 6, 1871.

IMPROVEMENT IN FILES.

The Schedule referred to in these Letters Patent and making part of the same.

*To all whom it may concern:*

Be it known that I, HIRAM B. NICKERSON, of Boston, in the county of Suffolk and State of Massachusetts, have invented certain new and useful Improvements in Files; and I do hereby declare that the following is a full and exact description thereof, reference being had to the accompanying drawings and to the letters of reference marked thereon.

The nature of my invention consists in arranging the teeth of machine-cut files in decreasing and increasing series within certain limits, so that, though cut by machine, the teeth have a systematic irregularity.

A float-file cut by my improved method will not "chatter," from the fact that the teeth, being unlike each other, will not all act in sufficient unison to produce that effect.

A crosscut-file will not produce channels or scratches, unless the teeth are accurately aligned. Files cut with the ordinary machines are thus aligned, and thus produce scratches. Files cut with teeth arranged by my new method will not produce channels or scratches from the fact that the teeth are arranged in waved lines.

To enable others skilled in the art to make my improved file, I will proceed to explain the method of arranging the teeth.

In the drawings—

Figure 1 is a view of a crosscut-file, with series of decreasing and increasing teeth.

Figure 2 is a plan of a float-file, with similarly arranged teeth.

Figure 3 is a longitudinal section, showing the teeth of a float-file.

By inspection of fig. 1 it will be seen that the intersection of two sets of irregularly-spaced lines will, if united by a third line, be found to be arranged in a sinuous line, A B, fig. 1. But it is well known that the intersections of two sets of regularly-spaced lines will, if united by a third line, be found to be arranged in a straight line.

In my machine-file the channels forming the teeth are irregularly spaced, so that in the case of a crosscut-file the teeth form a sinuous line, as represented by A B, fig. 1, so that the file will not scratch—that is, form parallel channels—from the fact that one tooth will not follow in the track of its leader, as in the case of an ordinary machine-cut file.

The objection to a machine-cut float-file is that the teeth are so regularly spaced that one works exactly like another, and all working in perfect harmony cause the file to chatter or move with a rapid ricochet, which interferes seriously with the production of good work.

By my arrangement of teeth, as shown in figs. 2 and 3, this difficulty is entirely overcome.

Upon a critical examination of my file it will be seen that the teeth which are nearest to each other are cut somewhat deeper than those which are wider spaced. This result is incidental to the arrangement of teeth, since the metal, being finely cut, cannot offer so much resistance to the action of the chisel as it could if coarse-cut.

What I claim as my invention, and desire to secure by Letters Patent, is—

As a new article of manufacture, a file whose surface is serrated in two or more series of parallel lines, whose distance apart is increased or diminished in a given ratio, in the manner shown and described.

H. B. NICKERSON.

Witnesses:
WILLIAM EDSON,
A. HUN BERRY.